March 9, 1937.　　J. H. DE IONGH　　2,073,445
WEIGHING MACHINE COMPRISING MEANS FOR OPERATING
A VALVE, A COUNTER, OR ANOTHER DEVICE
Filed June 28, 1934

Inventor;
Johan H. de Iongh

Patented Mar. 9, 1937

2,073,445

UNITED STATES PATENT OFFICE 2,073,445

WEIGHING MACHINE COMPRISING MEANS FOR OPERATING A VALVE, A COUNTER, OR ANOTHER DEVICE

Johan Hendrik de Iongh, The Hague, Netherlands

Application June 28, 1934, Serial No. 732,887
In the Netherlands February 27, 1933

4 Claims. (Cl. 265—56)

In order that a weighing machine shall operate with accuracy, its moving parts should not encounter any appreciable frictional or other resistances. If, therefore, a valve or another device is to be operated by one of said parts, it is common practice to cause the index pointer to make electric contact with a second, loosely mounted pointer so as to establish an electric circuit for operating the said device and for moving the second pointer. With this known construction, however, the required contact pressure is liable to slightly interfere with the accuracy of the weighing operation. Moreover, electric contacts are not reliable under all circumstances.

The object of this invention is to obviate the said inconveniences. With this object in view, a moving part of the weighing machine is associated with the distributing member of a hydraulic servomotor in such a manner that said member is adapted to be moved practically without friction. Preferably, the distributing member is entirely relieved from hydraulic pressure and also from its own gravity either by being counterbalanced, or by being hollow so as to be suspended in the liquid.

In accordance with this invention, the said novel means may advantageously be used for controlling the weight that counterbalances the load. Said weight may be in the form of a sliding weight on the weighing beam and adapted to be moved by the servomotor in such a manner that the weighing machine automatically tends to assume the position of equilibrium.

Since the weighing machine automatically tends to assume the position of equilibrium, the weighing beam, under the influence of the servomotor, may tend to oscillate about the neutral position. In accordance with the present invention, this may be prevented by the distributing member for the supply of pressure fluid to the servomotor being connected to a part of the weighing apparatus with a certain amount of lost motion, in such a manner that within the range of said lost motion the distributing member is adapted to be controlled by the servomotor itself.

Figure 1:
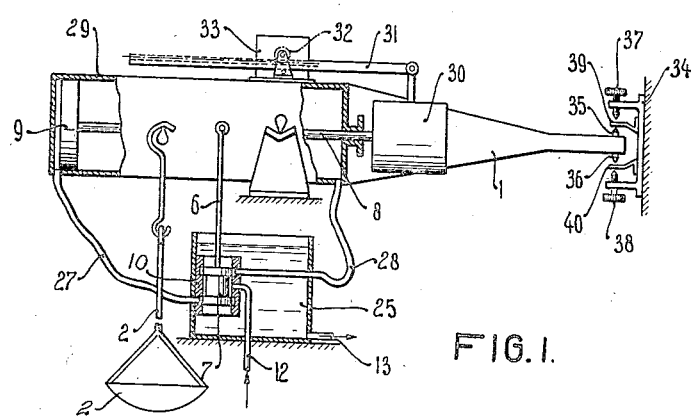
Figure 2:
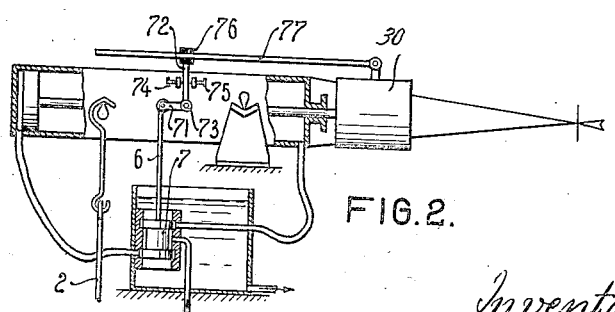

Figs. 1 and 2 of the annexed diagrammatic drawing illustrate two embodiments of this invention.

As shown in Fig. 1, the apparatus comprises a weighing beam 1 on one end of which is provided a sliding weight 30 while from the other end hangs a weighing pan 2. A rod 6 is connected to the weighing beam 1 between the weighing pan 2 and the fulcrum about which the weighing beam pivots. The rod 6 is connected to a distributing valve 7 which moves in a ported casing 10 connected to which is a pressure fluid supply pipe 12. The ported casing 10 is placed in a receptacle 25 filled with the liquid that serves as a pressure fluid.

A piston 9 of the servomotor is movable in the cylinder 29 and connected through its piston rod 8 with the sliding weight 30 adapted by means of a rack bar 31 and a pinion 32 to actuate a counter 33. Cylinder 29 forms part of the weighing beam 1 and is connected through flexible pipes 27, 28 with casing 10 of the distributing member 7. The free end of the weighing beam 1 is provided with projections 35, 36 adapted to engage set screws 37, 38 through spring blades 39, 40 provided on a frame 34.

The servomotor is so arranged that deflection of the weighing beam causes the sliding weight 30 to be displaced, until equilibrium is reestablished. If the beam 1 is deflected by the weight of a load in the weighing pan 2, rod 6 and valve 7 are moved downwards. In this position of valve 7 pipe 28 is connected to the interior of receptacle 25 and fluid pressure is communicated from pipe 12 to pipe 27 and actuates piston 9 and piston rod 8 so that the sliding weight 30 is moved over into the position of equilibrium. If the sliding weight 30 moves past this position, the rod 6 and valve 7 move upwards and pipe 27 is then connected to the interior of the receptacle 25 while fluid pressure from the pipe 12 passes through pipe 28 and moves the weight 30 to the left. The path through which the sliding weight has moved from its neutral position (i. e. the position which it assumes when the weighing pan is empty) is proportional to the weight of the load and is registered by the counter 33. As only a slight deflection of the weighing beam suffices for operating the servomotor, said deflection is limited by the set screws 37, 38. The springs 39, 40 act to move the weighing beam to the position of equilibrium when this beam approaches said position, so as to prevent oscillation thereof as far as possible.

The pipe 13 shown in Fig. 1 is provided to conduct liquid from the receptacle 25 to a pump (not shown) whereby the liquid is forced as pressure liquid through pipe 12 into the casing 10 of the distributing valve 7 to operate the piston of the servo-motor.

In order to prevent the weighing beam from oscillating about the position of equilibrium, the apparatus may also be constructed in accordance with Fig. 2. In this case, the distributing member 7 is connected to the weighing beam through the valve rod 6 and a link 71. The latter forms part of a bell crank lever, the other arm of which is designated by 72 and is provided with a spring eye 76 engaging with a certain amount of pressure a rod 77 secured to the sliding weight 30. The bell crank lever 71, 72 is pivoted as at 73 to the weighing beam and has freedom of movement between stops 74 and 75. If the weighing beam 1 becomes deflected under the influence of the load, the sliding weight 30 is moved to the right by the servomotor, arm 72 engaging stop 75. Since the sliding weight reaches the position of equilibrium at an earlier moment than does the weighing beam, said weight moves beyond said position, whereby the weighing beam becomes deflected in the opposite direction, the servomotor is reversed and the sliding weight is returned. This reverse motion of the servomotor is also utilized for moving back the distributing valve 7 within the limits of the clearance between stops 74 and 75, that is to say, independent of the movements of the weighing apparatus. Preferably said clearance is adjustable, and when correctly adjusted, the weighing apparatus comes to rest in its position of equilibrium after only one reversing movement of the sliding weight.

What I claim is:—

1. In a weighing machine of the kind described, the combination with the weighing beam and a sliding weight of a hydraulic servo-motor, a piston movable therein and carrying said sliding weight for displacing the same, a distributing member controlling inlet and outlet ports for the pressure liquid to and from said servomotor, and means operatively connecting said member with said weighing beam whereby in the position of equilibrium of said weighing beam the said inlet and outlet ports are closed, the oscillation of said weighing beam operating said distributing member so as to permit the pressure liquid to move said piston and thereby said sliding weight in one or the other direction.

2. In a weighing machine of the kind described, the combination with the weighing beam and a sliding weight, of a hydraulic servo-motor, a piston movable therein and carrying said sliding weight for displacing the same, a distributing member controlling inlet and outlet ports for the pressure liquid to and from said servo-motor, and means operatively connecting said member with said weighing beam and with said servo-motor whereby in the position of equilibrium of said weighing beam the said inlet and outlet ports are closed, the oscillation of said weighing beam operating said distributing member so as to permit the pressure liquid to move said piston and thereby said sliding weight in one or the other direction, said distributing member at the same time acting as a damper for the movements of said weighing beam.

3. In a weighing machine of the kind described, the combination with the weighing beam and a sliding weight of a hydraulic servo-motor, a piston movable therein and carrying with said sliding weight for displacing the same, a rod secured to said sliding weight, a distributing member controlling inlet and outlet ports for the pressure liquid to and from said servomotor, and means operatively connecting said member with said weighing beam whereby in the position of equilibrium of said weighing beam the said inlet and outlet ports are closed, the oscillation of said weighing beam operating said distributing member so as to permit the pressure liquid to move said piston and thereby said sliding weight in one or the other direction, said means including a bell-crank pivotally mounted on said weighing beam and having one arm in frictional engagement with said rod.

4. The combination as specified in claim 3, including two adjustable stops provided on said weighing beam in a position to be engaged by said arm of said bell-crank.

JOHAN HENDRIK DE IONGH.